United States Patent Office

3,420,773
Patented Jan. 7, 1969

3,420,773
TREATMENT OF WATER
Joseph G. Selmeczi, Bridgeville, Pa., assignor, by mesne assignments, to Ionics, Incorporated, Watertown, Mass., a corporation of Massachusetts
No Drawing. Filed Mar. 3, 1966, Ser. No. 531,337
U.S. Cl. 210—28           7 Claims
Int. Cl. C02b 1/60; C02b 1/26

ABSTRACT OF THE DISCLOSURE

Method for removing anions from water by providing a body of weakly basic anion exchange resin in substantially its free base form, introducing carbon dioxide into a stream of water to be purified, passing the water through the resin with removal of the anions and regulating the carbon dioxide flow into the stream to control the removal of anions from the water, the anions being removed in order of decreasing exchange potential. Additionally, ferrous salts will precipitate out as ferrous carbonate.

---

This invention relates to treatment of water, more particularly to remove one or more anions from it and to the treatment of acid mine water.

Water has long been softened with naturally occurring zeolites and synthetic cation exchangers. Such practices remove objectionable cations, such as calcium and magnesium, usually completely. Natural waters as, for example effluent from coal mines and industrial wastes, such as waters from chemical process operations contain not only objectionable cations but also anions, especially those of strong acids, which may be undesirable according to the particular anion and the amount of it present, from the standpoint of potability or for use for various operations. For instance, a water may contain sufficient chloride salinity as to be objectionable from the taste standpoint, or sulfate content may be so high as to cause the water not only to be unpleasant for drinking but also to exert an undesirable laxative effect. Again, nitrates and phosphates in water present a problem arising from the increasing use of nitrate and phosphate fertilizers and also due to phosphate detergents. High nitrate content of water or milk (due to cows drinking water with high nitrate content) used for the preparation of infants' formulas is known to be the cause of methemoglobinia or nitrate cyanosis. Nitrates and phosphates are undesirable also in surface water reservoirs, lakes, rivers and canals because they tend to cause objectionably heavy plant growths.

Anions can be removed from water with an anion exchange resin, i.e. a cross-linked synthetic resin in which a primary, secondary, tertiary or quaternary amine has been incorporated, but heretofore the procedures using them have been subject to certain deficiencies or disadvantages. For instance, prior practices have resulted in complete or substantially complete exchange of specific anions or all the anions. On the other hand, for some purposes it may be desirable to remove only one or certain anions, either partially or wholly. Again, many existing anion exchange procedures involve treatment of the water with an anionic exchange resin coupled with a cationic exchange resin which involves increased resin cost, regeneration cost, and cycle times as compared with operations involving a single type of resin.

It is among the objects of this invention to provide a method of treating water to remove anions from it which is simple, rapid, easily practiced and economical, and which does not require elaborate or expensive apparatus and in fact may be practiced with fewer apparatus units than are needed for conventional methods using both anionic and cationic resins.

Another object is to provide such a method which affords preferential removal of one or more anions of strong acids in accordance with the requirements set forth and to which the treated water is to be put.

A further object is to provide a method for the partial removal of at least one anion.

Also another object is to remove soluble iron from water without oxidation of iron.

A further object is to provide a method in accordance with the objects just stated in the practice of which the use of a cationic exchange resin is avoided.

Still another object is to provide a method in accordance with one or more of the foregoing objects in which in addition to preferential removal of anions the treated water will have reduced content of total dissolved solids.

A particular object is to provide a method of treating acid mine effluents to effect substantial reduction or complete removal of soluble iron.

Other objects will appear from the following specification.

In accordance with this invention carbon dioxide, $CO_2$, is introduced into the raw water as it is fed to a weakly basic anionic exchange resin in its free base form, such as Amberlite IRA 68, a resin sold by Rohm and Haas Company, of Philadelphia, Pa., or other weakly basic anionic exchange resin of properties equivalent for the purposes of the invention. The $CO_2$ is converted by the resin to its bicarbonate form, $RNH^+HCO_3^-$, whereby the resin is able to absorb (or exchange) an equivalent amount of another acidic anion, and by regulation of the amount of $CO_2$ fed into the incoming raw water (and hence the amount of bicarbonate formation) the extent of anion exchange can be controlled to achieve desired preferential anion removal.

The type of anion being removed during the conversion of carbon dioxide to bicarbonate will usually very closely follow the rule of decreasing exchange potentials which for the most common anions is: sulfate>nitrate≈phosphate>chloride>bicarbonate. In other words sufficient carbon dioxide has to be fed to the incoming water to achieve nearly complete removal of sulfate before removal of nitrate and phosphate, and after they have been exchanged there must be enough $CO_2$ in the incoming stream to remove chloride successively if it is to be removed.

With the proper dosing of carbon dioxide any desired proportion of original sulfate content can be converted to bicarbonate without using resin capacity for the removal of other anions. Since high sulfate concentration in drinking water is objectionable because of its laxative effect and also on its effect on taste, U.S.A. and International Health Standards suggest a limit of 200-250 p.p.m. of sulfates for palatable water.

Carbon dioxide dosage in excess of what is necessary for complete removal of sulfates will, as indicated, effect the removal of nitrates and phosphates before chlorides, and with appropriate dosage of carbon dioxide preferential successive or complete removal of sulfates, nitrates, and phosphates can be achieved without consumption of resin capacity to remove chloride also. Equally, in the same fashion chloride removal may be accomplished following removal of $SO_4$, $NO_3$, and $PO_4$, should that be desirable.

The advantage of this preferential method for the removal of sulfates, nitrates and phosphates is evident compared to the conventional ion exchange methods where effective removal of these anions is possible only if all anions, including chlorides and most often bicarbonates, are also removed in toto.

Stated otherwise, each mol of $CO_2$ fed is equivalent to one mol of a monovalent anion. Thus a mol of $CO_2$ is capable of causing exchange of one mol of $NO_3^-$ anion, while two mols of $CO_2$ will be necessary to effect the exchange of one mol of a divalent anion such as $SO_4^{--}$. In other words, 44 p.p.m. (or mg. per liter) of $CO_2$ will effect exchange of 52 p.p.m. (or 52 mg. per liter) of $NO_3^-$, and similarly, 88 p.p.m. (or 88 mg. per liter) of $CO_2$ will exchange 96 p.p.m. (or 96 mg. per liter) of $SO_4^{--}$.

Thus in accordance with the invention, water can be treated to exchange to bicarbonate any desired proportion or all of sulfate ion present, or of sulfate, nitrate and phosphate etc., in accordance with the order of activities or exchange potentials, stated above. As an example, consider a water containing 200 p.p.m. of $SO_4$, 100 p.p.m. of $NO_3$, 200 p.p.m. of Cl and 100 p.p.m. of $HCO_3$ all expressed as $CaCO_3$. The $SO_4^{--}$ and $NO_3^-$ can be removed substantially completely by injecting into this water as it passes to a bed of ion exchange resin suitable for this purpose 264 p.p.m. (264 mg. per liter) of $CO_2$ with production of an effluent containing the chloride originally present and 400 p.p.m. of bicarbonate expressed as $CaCO_3$ but substantially free from $SO_4^{--}$ and $NO_3^-$.

It will be obvious to those who are familiar with the art of ion exchange that the carbon dioxide requirements may be reduced if the carbon dioxide content of the raw water—which may be present in the form of free $CO_2$ or combined in the form of bicarbonate or carbonate—is utilized through various pretreatment procedures such as application of acid or cation exchangers in the hydrogen form, and also that the effluent may be further treated according to the requirements of final utilization of water and it is not my intention to limit the scope of the invention to applications where no additional pre or post treatment is practiced.

Carbon dioxide can be introduced into the stream of raw water as it passes to the exchanger under moderate pressure in the form of gas from cylinders of compressed $CO_2$, or from $CO_2$ generators of which a variety of types are available on the market.

When the weakly basic anionic resin becomes exhausted to the point where it is unable to complete the conversion of carbon dioxide to bicarbonate with accompanying exchange of anions, it is readily and quickly regenerated, preferably with a weak base such as ammonia or lime, depending on conditions. This may be accomplished without removing the exchange resin from the exchanger, followed by washing, or, for continuous operation there may be used two exchangers with one being regenerated while the other is in active operation.

The process is equally applicable to moving bed operations where the ion exchange resin moves countercurrent to the water and the various cycles such as service, resin cleaning, regeneration and rinse can be carried out in separate vessels either in continuous, pseudocontinuous or intermittent operations.

Although the exact reactions or their sequence, or whether they occur concurrently, so to speak, rather than in any order is not known but the over-all process may be represented as follows, using sulfate as an example, where RN represents the free base form of IRA 68 or other weakly basic anionic exchange resin effective for the purposes of the invention:

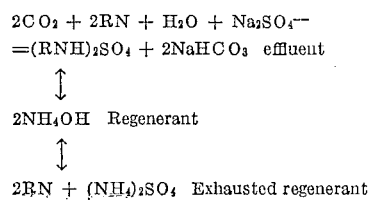

As will be understood by those familiar with the art, the same relations will apply to $NO_3$, $PO_4$ and Cl.

The invention is especially useful for the treatment of acid coal mine effluents. Water descending through the coal strata leaches and oxidizes sulfides with production of ferrous sulfate. Contact with air will cause conversion to ferric sulfate and sulfuric acid and thus result in acid mine water. This can be avoided and good quality water can be obtained by the application of this invention to the mine water preferably prior to the oxidation of iron by atmospheric oxygen.

Oxidized ferric iron becomes highly insoluble and precipitates out when the pH of the water is raised. This mechanism is well known and requires no further discussion here, only the removal of unoxidized ferrous iron will be considered in the following.

In this embodiment of the invention $CO_2$ is injected under pressure into the water before it undergoes substantial oxidation and as it enters a bed of the weakly basic anionic resin in the free base form. Most suitably the mine water is introduced into the bottom of the unit so that the upward flow will tend to carry out precipitated solids and thus minimize containment of solid particles by the exchanger beads.

The weakly basic resin will absorb sulfate while converting the carbon dioxide to bicarbonate. Due to the pH conditions a small portion of carbon dioxide will be converted to carbonate ions according to the second dissociation constant of carbonic acid, and in turn the carbonate ions will precipitate out with the iron in the form of ferrous carbonate ($FeCO_3$). With the removal of carbonate ions from solution new ones will form from bicarbonate ions as per the dissociation constant and further amount of iron will precipitate out, and this will continue until equilibrium is reached at a given pH. The pH is controlled by the basicity of the ion exchange resin. It is obvious from the foregoing that one mol of $CO_2$ is able to precipitate one mol of divalent iron and effect the exchange of one mol of divalent sulfate ion as long as ferrous carbonate precipitation occurs. It was found by calculations and confirmed in practice that by the practice of the invention a small excess of bicarbonate ions is sufficient to remove iron in the ferrous carbonate form and obtain a soluble iron concentration in the effluent of less than 0.1 p.p.m.

The amount of iron remaining in solution is the function of both pH and total carbon dioxide content after precipitation of ferrous carbonate.

The equation describing the quantity of soluble iron in the presence of carbonate ions is as follows:

$$\log [Fe^{++}] = -10.67 - \log [CO_3^{--}]$$

where both $[Fe^{++}]$ and $[CO_3^{--}]$ are the activities of the respective ions. Since we are working with dilute solutions substitution of concentrations for activities causes small errors. $CO_3^{--}$ concentration may be obtained from this equation:

$$\log [CO_3^{--}] = -10.3 + \log [HCO_3^-] + pH$$

Concentration of soluble iron then becomes $$\log [Fe^{++}] = -0.37 - \log [HCO_3^-] - pH$$

It can be calculated from the previous formula that, for example, at pH 8.5 bicarbonate concentration of $10^{-3}$ mol (approx. 61 p.p.m. as $HCO_3$) solubility of ferrous iron becomes approximately .076 p.p.m. as $Fe^{++}$.

Since it is obvious that with manipulation of bicarbonate content and pH any desired iron leakage can be obtained, in some instances increasing the pH at the effluent may be more desirable and less expensive than increase of bicarbonate content via carbon dioxide feed. In the previous example if the bicarbonate concentration is reduced to $10^{-4}$ mol (approx. 6.1 p.p.m.), about 1 p.p.m. of strong alkali is sufficient to raise the pH from 8.5 to 9.5 to result in the same (.076 p.p.m. as Fe) low soluble iron concentration.

The bulk of the insoluble ferrous carbonate leaves the bed upflow and can be filtered out by conventional filters, collected and used or disposed of. The portion of the iron collected on the beads of ion exchange resin can be removed by agitating the bed with a gas devoid of oxygen, such as nitrogen. There is virtually no consumption of this agitating gas since it can be recirculated and the use of it adds very little to the cost of the operation. If resin with sufficient density is used, air washing can be eliminated and iron can be effectively removed from the beads during backwash.

Procedures other than previously described may be practiced here such as pulsating water flow, teetering created by an auxiliary device or countercurrent continuous or semicontinuous processes.

It is to be expected as in all ion exchange operations that the operating conditions will vary somewhat from one installation to the other depending on the composition of the water, size of the equipment and some other parameters, and the actual operating procedures will be decided by the designer or plant operator.

Synthetic acid mine water was prepared as a test solution by adding 400 p.p.m. of ferrous sulfate expressed as $CaCO_3$ to tap water. After mixing, the water had the following composition:

| | P.p.m. as $CaCO_3$ |
|---|---|
| Hardness | 96 |
| Sodium | 116 |
| Iron | 400 |
| Chloride | 36 |
| Sulfate | 576 |
| Alkalinity | 0 | pH, 4.6.

Total dissolved solids content: 612 p.p.m. as $CaCO_3$.

200 mg. per liter of carbon dioxide was injected into this water prior to passing it to the weakly basic anion exchange resin (IRA 68) column. The quality of effluent after passing through the ion exchanger and sediment filter was as follows:

| | P.p.m. as $CaCO_3$ |
|---|---|
| Hardness | 96 |
| Sodium | 116 |
| Iron | Trace |
| Chloride | 36 |
| Carbonate | 3 |
| Bicarbonate | 48 |
| Sulfate | 124 | pH, 8.9.

Total dissolved solids content: 212 p.p.m.

It was found that by using a 24″ deep bed of resin at 1 gallon per minute per square foot flow rate, capacity obtained between repeated exhaustions and regeneration is 12–15 kilo grains per cu. ft. expressed as $CaCO_3$.

The quality of treated water compares very favorably with effluents of other treatment methods where iron is oxidized and acid is neutralized with alkalis. If the same water was treated by oxidizing the iron and the acid is neutralized with lime, total solids concentration may even increase substantially and result in increased total hardness. pH control is very difficult with hydroxide ions whereas in the present process the bicarbonate ion would tend to hold the pH within reasonable limits and supply an additional buffer action against further acid formation should the stream receive further pollution later on.

Acid mine water treated by this process is of good enough quality for general use and it may be further treated for certain specific application.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method of removing strongly acidic anions from water comprising the steps of providing a body of weakly basic anionic exchange resin in substantially its free base form, introducing carbon dioxide into a stream of the water containing strongly acidic anions on its way to said body, and then passing the water into contact with said resin to remove the strongly acidic anions with at least partial conversion of the resin to its strongly acidic anion form and regulating the amount of carbon dioxide fed to the stream to effect removal of said anions from the water to a desired extent, and recovering the thus treated water.

2. A method according to claim 1, in which the carbon dioxide fed is regulated to remove up to all of the $SO_4^{--}$ ion present and to leave other anions in the water.

3. A method according to claim 1, in accordance with which there are progressively removed $SO_4^{--}$ ion in substantial entirety together with removal of up to all of $NO_3^-$ and $PO_4^{---}$ ions.

4. A method according to claim 1, said resin being regenerated with an alkali.

5. A method in accordance with claim 1, in which the water to be treated is acid mine water discharge containing iron where the iron content of the water consists substantially of ferrous salts and the iron is precipitated in the form of ferrous carbonate.

6. A method in accordance with claim 1 in which the water to be treated is acid mine water discharge containing iron the ferrous content of the water is converted to insoluble ferrous carbonate, and the water is flowed upwardly through the body of resin to carry out the insoluble carbonate.

7. In a method of removing soluble ferrous iron from water in the form of ferrous carbonate comprising the steps of introducing carbon dioxide into a stream of water containing iron and strongly acidic anions, passing the water containing the carbon dioxide into contact with a weakly basic anionic exchange resin with resulting removal of the anions from the water and precipitating ferrous carbonate, and separating the ferrous carbonate from the water thus treated.

References Cited

UNITED STATES PATENTS

| 2,670,335 | 2/1954 | D'Alelio | 210—37 X |
| 2,702,275 | 2/1955 | Bauman | 210—28 |
| 2,733,205 | 1/1956 | Dalton et al. | 210—37 X |
| 3,156,644 | 11/1964 | Kunin | 210—37 X |
| 3,258,070 | 6/1966 | Reusser | 210—37 X |
| 3,284,351 | 11/1966 | Dajani et al. | 210—24 X |

REUBEN FRIEDMAN, *Primary Examiner.*

C. M. DITLOW, *Assistant Examiner.*

U.S. Cl. X.R.

210—32, 37, 38, 42